July 7, 1942.   G. R. NEWLON   2,288,731
CLOSURE PLUG FOR PIPE ENDS
Filed June 18, 1941
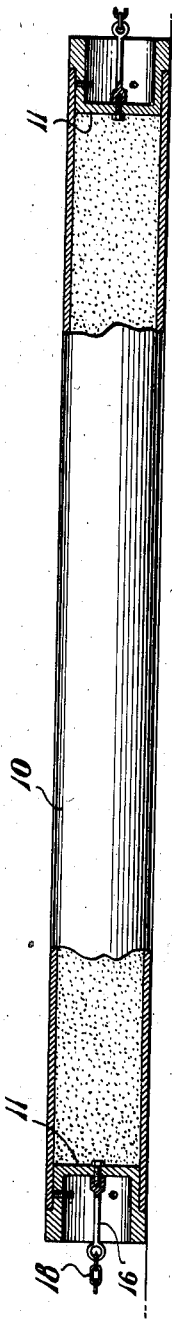
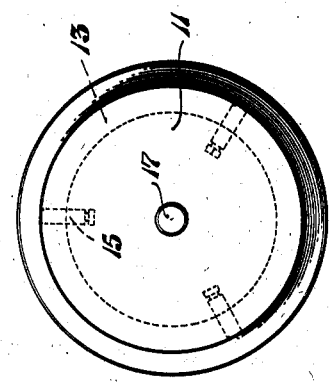
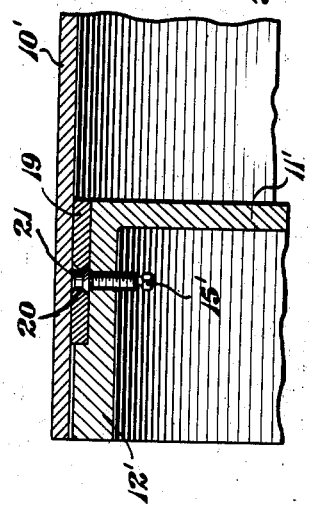
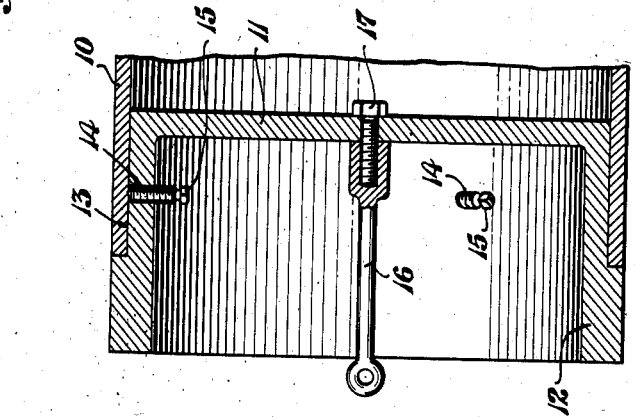
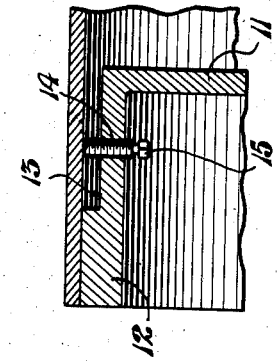
INVENTOR.
George R. Newlon,
BY
A. Yates Dowell Patented July 7, 1942

2,288,731

UNITED STATES PATENT OFFICE 2,288,731

CLOSURE PLUG FOR PIPE ENDS

George R. Newlon, Point Pleasant, W. Va., assignor to Marietta Manufacturing Company, Point Pleasant, W. Va., a corporation Application June 18, 1941, Serial No. 398,690

6 Claims. (Cl. 138—89)

This invention relates to closure plugs for closing the ends of pipe lengths or sections during bending and like operations.

It is common practice to fill a section of pipe with sand or like material prior to the bending operation to prevent the pipe from collapsing or becoming deformed as a result of bending stresses. To prevent the sand from passing out the ends of the pipe section, closure plugs are used. A common type of closure plug heretofore used for this purpose was a tapered plug generally made of wood which, unless it had an exact fit for a certain diameter of pipe, would exceed the overall diameter of the pipe and as a consequence prevent the latter from lying flat on its supporting surface, thereby complicating handling of the pipe. Also, in order to make a tapered plug hold, it is necessary to drive the same tightly into the end of the pipe with the result that it is extremely difficult to release and remove the plug. Again, where the pipe is heated to effect bending, a plug made of wood or like combustible material will ofttimes burn out with consequent loss of time and the possibility of a defective bend. If a tapered plug is made of metal, it is extremely difficult to apply and remove and matters are complicated by differential expansion.

The present invention has in view the provision of a closure plug which may be easily applied and removed, and when applied has its exterior diameter on a line with the exterior diameter of the pipe so that the latter may lie flush on its supporting surface. Furthermore, the plug is adapted for pipes of varying diameters or size, will not burn and facilitates handling of the pipe. Thus the advantages of a closure plug of the tapered type are realized while the disadvantages are eliminated.

The various objects and advantages of the improved closure plug will become apparent in view of the following description taken in conjunction with the drawing, wherein:

Fig. 1 is a broken sectional view of a length of pipe having the improved closure plug applied thereto;

Fig. 2 is an enlarged section of one end of the pipe of Fig. 1;

Fig. 3 is an inner end view of the plug;

Fig. 4 is a fragmentary sectional view showing the plug in an alternate position with respect to Fig. 2; and Fig. 5 is a view similar to Fig. 4 of a modification in structure.

Referring to the drawing in detail, a length of pipe is indicated at 10 and is filled with sand preparatory to the bending operation. The plugs at opposite ends of the pipe serve to retain the sand in the pipe while the latter is being bent to avoid collapsing and deformation of the walls of the pipe. Each plug is in the form of a cup-shaped member having an inner wall 11 and a connecting cylindrical side wall 12. The periphery of the wall 12 is formed with one or more stepped recesses 13, each step of which constitutes in effect a plug of a predetermined diameter to accommodate different standard sizes of pipe. The wall 12 is also formed with a series of radial threaded bores or openings 14 each of which is adapted to receive a set screw 15 and whereby when the plug is inserted in the pipe it is held in set position. An eye or draw bolt 16 is connected to the wall 11 by means of a stud bolt 17, to facilitate removal of the plug and handling of the pipe. A chain or like member 18 may be connected to the bolt 16.

In using the plug, it is inserted in the end of the pipe and the screws 15 adjusted in contact with the wall of the pipe to hold the plug against displacement. In Figs. 1 and 2 the plug is shown mounted for one diameter of pipe, while in Fig. 4 it is shown mounted in a larger diameter of pipe. It will be noted that in each instance the peripheral surface of the wall 12 fits flush against the wall of the pipe and contacts the latter over an extended area, to thereby more securely brace the pipe end than where a tapered or other type of plug is used which makes contact only over a limited area. After the pipe has been bent, to remove the plug it is only necessary to retract the screws 15 and pull outwardly on the draw bolt 16. Once the screws 15 are retracted the plug may be withdrawn with relative ease, since it does not depend primarily upon a wedge fit for maintaining it in installed position.

Fig. 5 illustrates how the plug may be adapted for different diameters of pipe in addition to those provided for by the stepped surfaces 13. In this instance, corresponding parts are given like reference numerals with the exception that the exponent "prime" has been added. Shim rings 19 of varying overall diameters are provided and adapted for mounting on the recessed periphery of the wall 12', each ring being formed with radial openings or bores 20 for registration with the set screws 15'. A thrust plug 21 is preferably mounted within each bore 21 for contact by the end of screw 15' so that irrespective of the overall diameter of the ring 19, the same length of adjusting screw may be used. A supply of the shim rings 19 may be carried in stock for use with each plug.

Actual use in service has demonstrated the ease and facility of applying and removing the plug as well as the effective bracing action of the plug when installed within the pipe ends. The plug may be manufactured at a relatively low cost comparable to the cost of the ordinary tapered plug, and one set of plugs will take care of the average range of pipe diameters. The draw bolt or pull link 16 furnishes a convenient means for attachment of a chain or cable in handling the pipe in addition to facilitating removal of the plug.

It will be understood that certain minor changes in construction and design may be adopted without departing from the spirit or scope of the invention as defined by the appended claims.

What is claimed is:

1. A closure plug for pipe ends comprising a hollow member having a cylindrical peripheral wall formed with a recessed surface for insertion in a pipe, a shim ring adapted for insertion on said recessed surface, said cylindrical wall having a series of radially adjustable set screws mounted therein and said ring being formed with openings for registration with said set screws, and thrust plugs mounted in the openings of said shim ring for abutting engagement with said set screws and clamping engagement with the wall of the pipe.

2. A closure plug for pipe ends comprising a hollow substantially cup-shaped member having a rigid cylindrical peripheral wall formed with a series of stepped outer surfaces of varying diameter and whereby the plug may be telescoped within different diameters of pipe, each of said stepped surfaces extending in a plane paralleling the wall of the pipe for flush contact with the latter, and clamping members mounted for radial movement outwardly through the surface of smallest diameter.

3. A closure plug for insertion in pipe ends to prevent loss of filling material from a length of pipe during bending and like operation, comprising a hollow cup-shaped member having a rigid peripheral wall of substantial thickness for insertion within a pipe end, the outer circumference of said wall being formed with an annular recess providing a plurality of axially extending plug lengths of stepped diameters to adapt the plug to different diameters of pipe, and clamping members mounted for movement radially outwardly through the recessed wall of said member for releasable engagement with the pipe.

4. A closure plug for insertion in pipe ends to prevent loss of filling material from a length of pipe during bending and like operation, comprising a hollow cup-shaped member having an end wall and a rigid peripheral wall of substantial thickness for insertion within a pipe end, the outer circumference of said peripheral wall being formed with an annular recess providing a plurality of axially extending plug lengths of stepped diameters to adapt the plug to different diameters of pipe, clamping members mounted for movement radially outwardly through the peripheral wall of said member for releasable engagement with the pipe, said clamping members being located in the outer wall of the extreme forward plug length of smallest diameter, and a connecting member secured to said end wall to facilitate removal of the plug and handling of the pipe.

5. A closure plug for insertion in pipe ends to prevent loss of filling material from a length of pipe during bending and like operations, comprising a hollow member having a rigid cylindrical peripheral wall of substantial thickness for insertion within a pipe end, the outer circumference of said wall being formed with an annular recess providing a plurality of axially-extending plug lengths of stepped diameters to adapt the plug to different diameters of pipe, a shim ring adapted for insertion on said recessed portion of the plug to adapt the plug to additional pipe diameters, and clamping members mounted for adjustment radially outwardly through said recessed wall, said shim ring being formed with openings adapted for registration with said clamping members.

6. A closure plug for insertion in pipe ends to prevent loss of filling material from a length of pipe during bending and like operations, comprising a hollow member having a rigid cylindrical peripheral wall of substantial thickness for insertion within a pipe end, the outer circumference of said wall being formed with an annular recess providing a plurality of axially-extending plug lengths of stepped diameters to adapt the plug to different diameters of pipe, a shim ring adapted for insertion on said recessed portion of the plug to adapt the plug to additional pipe diameters, clamping elements mounted for adjustment radially outwardly through said recessed wall, said shim ring being formed with openings adapted for registration with said elements; and thrust members associated with said openings for contact by said elements permitting use of substantially the same length of clamping element irrespective of the overall diameter of shim ring.

GEORGE R. NEWLON.